(Model.)
J. GRANT.
FILTER.
No. 254,475. Patented Mar. 7, 1882.
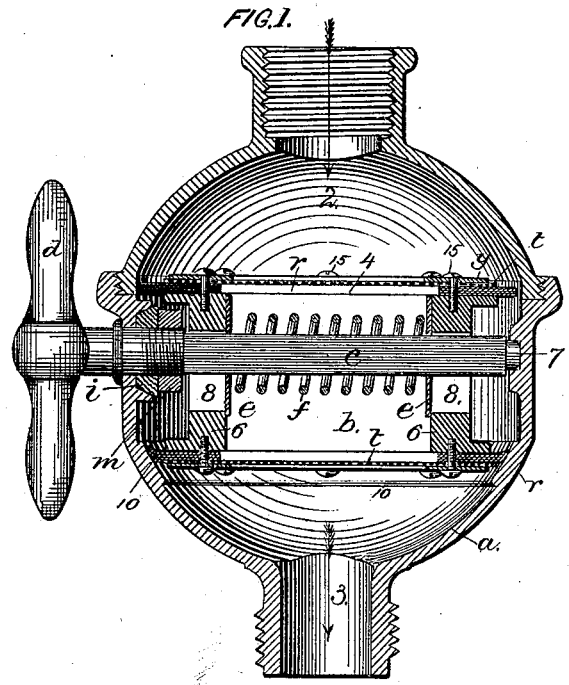
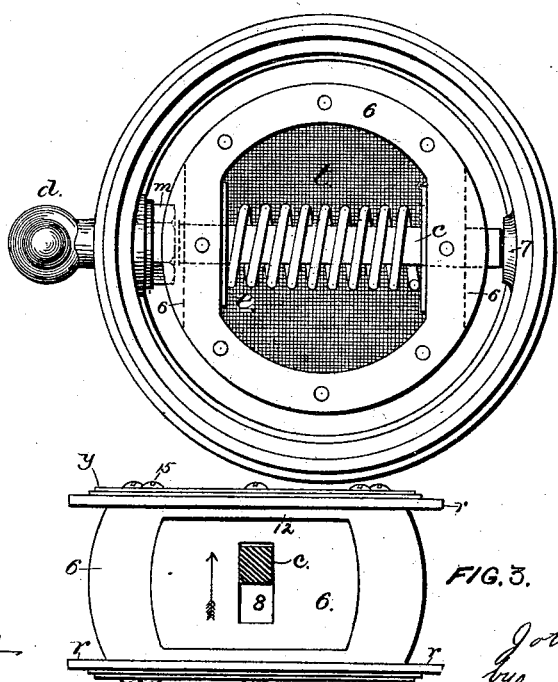
Witnesses.
John F. L. Prinkleh
L. F. Connor.
Inventor:
Jott Grant
by
Crosby & Gregory
Attys

UNITED STATES PATENT OFFICE.

JOTT GRANT, OF BOSTON, MASSACHUSETTS.

FILTER.

SPECIFICATION forming part of Letters Patent No. 254,475, dated March 7, 1882.

Application filed May 16, 1881. Renewed January 11, 1882. (Model.)

*To all whom it may concern:*

Be it known that I, JOTT GRANT, of Boston, county of Suffolk, State of Massachusetts, have invented an Improvement in Filters, of which the following description, in connection with the accompanying drawings, is a specification.

My invention relates to that class of water-filters known as "reversible filters," and its object is to simplify and cheapen the construction, and at the same time produce an efficient and reliable filter.

The invention is embodied in that class of filters in which a receptacle containing charcoal or other suitable filtering material is contained in a spherical case, and is free to rotate therein to reverse its position with relation to the flow of the water, so that the water may for a time enter at one side of the said receptacle and pass out at the other, and it may thereafter be reversed, so that the water, in now passing out at the side where it before entered, will carry away the sediment and impurities that have been collected, and thus cleanse the filter. When placed in an intermediate position the water passes freely through the outer case and around or through a special passage in the receptacle, without, however, passing through and being retarded by the filtering material therein. The internal filtering-receptacles have hitherto usually been made substantially spherical in shape, and have been seated as a valve upon a suitable seat in the said outer case, this construction requiring accurate turning and finishing of the surface of the receptacle and certain special arrangements to insure the proper seating of the valves, which are rendered unnecessary in my invention, in which the metallic part of the receptacle does not come in contact with the seat in the case, and is preferably made a considerable amount smaller than the outer case, and is shown as truncated by parallel planes, making openings into the interior of the receptacle, which is filled with charcoal or filtering material, as usual, the said openings being covered with gauze or perforated plates to confine the charcoal and permit the water to pass through to be filtered. A flexible washer is connected with the receptacle and arranged to bear upon the seat in the case, and preferably two washers are employed, they being made as annular rings fastened upon each end of the filtering-receptacle surrounding the openings, and extending out laterally therefrom a short distance, one of them, when the receptacle is in a position for the water to flow through, being pressed upon the spherical seat in the outer case by the water-pressure, as hereinbefore described, and preventing any flow of water around the receptacle between it and the case. By this plan the outer surface of the filtering-receptacle does not come in contact with the inner surface of the casing or a seat therein, and consequently it need not be finished on its outer surface, and it may be small enough to leave an ample space between it and the case for the flow of water when it is not desirable to have it pass through the receptacle and be filtered. The filtering-receptacle is mounted on a pivoted rod extending diametrically across through the receptacle and spherical case, and outside thereof, where it is provided with a suitable handle to enable it to be turned to reverse the position of the filtering-receptacle, which is connected with the said rod in such a manner as to be positively rotated therewith, but to have an independent movement transverse to the said rod in the direction of the flow of the water through it. When the filtering-receptacle is brought in position with its truncated or open ends in proper position for the water to flow through and be filtered it will be moved by the pressure of the water a short distance across the rod until its washer is brought to a firm seat in the case. In order to permit this movement independently of its operating-rod, the receptacle is provided with slots parallel to the direction of the flow of the water, through which the said rod passes; and in order to prevent the charcoal or filtering material from escaping through the said slots around the rod, washers fitting closely upon the said rod and of sufficient size to cover the slots are placed inside the receptacle and pressed against it by a suitable spring.

Figure 1 is a vertical section of a filter constructed in accordance with my invention, the receptacle being in position for the water to pass through and be filtered. Fig. 2 is a top view thereof, the upper portion of the case being removed; and Fig. 3, an end elevation of the receptacle and its washers, its operating-rod being shown in section.

The outer casing, a, of nearly spherical shape, may be of similar construction to those commonly used in this class of filters, it having inlet and outlet passages 2 3 for the water.

The filtering-receptacle b is considerably smaller than the inside of the case a, and may be of a substantially cylindrical shape, or, as shown in Fig. 3, formed as a portion of a sphere, it being truncated by parallel planes, as shown at 4 5, and preferably somewhat flattened, as shown at 6, at the ends of the axis upon which it turns. The said receptacle is rotated by means of a rod, c, pivoted at one end in a step, 7, in the case a, and extending at its other end out through the side of the said case, where it is provided with a handle, d, to enable it to be turned. The said rod c passes through slots 8 in the flattened portion 6 of the receptacle b, it being preferably squared where it passes through the receptacle, as shown in Fig. 3, to cause the said receptacle to be positively rotated therewith.

The slot a permits the receptacle to have an independent movement transverse to the rod c, as indicated by the arrow, Fig. 3.

Washers e are placed within the receptacle, fitting closely upon the rod c, and pressed by a spring, f, against the inner surface of the receptacle b, they being sufficiently broad to wholly cover the slots 8, as shown in Fig. 1, to thus prevent the escape of charcoal or other filtering material from within the receptacle b. The end of the rod c which passes out through the case is packed by a washer, i, held in its socket in the case by a nut, m, upon a threaded portion of the rod c. The truncated or open ends 4 5 of the receptacle b are provided with annular washers r, which are made of soft or flexible material that will form a tight joint when pressed upon the seat portion 10 of the inner surface of the case a.

The open ends 4 5 of the receptacle are closed by sheets of gauze or perforated plate t, by which the charcoal or other material is retained in the receptacle b, and through which the water passes into and out from the said receptacle, when turned by the handle d, into the position shown in Fig. 1, with the ends 4 5 at right angles to the flow of water through the case a, in which position the pressure of the water upon the said receptacle will move it across the rod c until the washer r is pressed firmly and tightly upon the inner surface of the case a, thus effectually preventing any flow of water between the said receptacle and case. When the handle d is turned one-fourth of a revolution, or is at right angles to the position shown in Fig. 1, the water will have a free passage from the inlet 2 to the outlet 3 around the sides of the said receptacle, between it and the case a, the washers r being then parallel to the flow of the water.

By flattening the ends of the filtering-receptacle, as shown at 6, a plane seat is furnished for the washers e, and extra space is afforded between the receptacle and case, as shown in Fig. 2, to make up for space occupied by the ends of the rod c and nut m in the path of the water when flowing around the receptacle.

The washer r and gauze t are preferably both held in place upon the ends 4 5 of the receptacle by a metal washer or collar, y, fastened thereto by screws 15.

By the herein-described construction a filter may be made with a large area for the flow of water, and rather shallow depth of filtering material interposed in its path, as is needed when the water is under moderate pressure; or the dimension can be readily changed to afford a larger amount of filtering material when the filter is to be used with water under such pressure that the said material will not too greatly obstruct it.

The washer r need not necessarily be placed at the extreme ends of the receptacle b. Instead of squaring the entire length of the rod c passing through the receptacle b, the end near the stop 7 may be flattened on one or both sides as far as the slot 8 nearest it; or a round rod may be used and a pin passed through it and into the receptacle, as shown at 12 in dotted lines, Fig. 3.

The washers e may be held against the receptacle by a tube surrounding the rod c, instead of the spring f, if desired. The movement of the receptacle b transverse to the rod e passing through it agitates the filtering material in the receptacle and prevents it from becoming caked together, as sometimes happens in the filters now in use.

The seat portion 10 on the inside of the case a may be raised somewhat above the remaining surface, as shown in Fig. 1, such arrangement enabling the said seat to be trued or finished more readily without turning or cutting the rest of the surface of the case.

I claim—

1. In a filter, the combination, with the outer casing, of a filtering-receptacle therein, and washer connected with the said receptacle and projecting laterally outward therefrom, and adapted to be seated upon the inside of the said outer casing, substantially as described.

2. The outer casing and the filtering-receptacle therein, combined with its operating rod or stem pivoted in the outer casing and passing through slots in the receptacle, as described, whereby the said receptacle is caused to rotate with the said rod, but has an independent movement transverse thereto, substantially as and for the purpose described.

3. The receptacle and its operating-rod passing through slots therein, combined with washers fitting the said rod and covering the said slots, substantially as and for the purpose described.

4. The filtering-receptacle and its operating-rod passing through slots therein, combined with washers fitting the said rod, and a spring to press them against the slotted portion of the receptacle, substantially as and for the purpose described.

5. The spherical outer casing, combined with the movable receptacle therein, and its operating-rod, extending loosely through the said receptacle and pivoted in the casing, substantially as described.

6. The outer casing, having an internal seat portion, and the receptacle therein, having openings on opposite sides, combined with washers surrounding the said openings, and the operating-rod, adapted to positively rotate the said receptacle and to permit it to have an independent transverse movement, whereby the said washers are pressed into tight contact with the said seat portion of the casing, substantially as and for the purpose set forth.

In testimony whereof I have signed my name to this specification in the presence of two subscribing witnesses.

JOTT GRANT.

Witnesses:
   JOS. P. LIVERMORE,
   W. H. SIGSTON.